Aug. 29, 1933.  B. P. FONDA  1,924,849
ADSORPTION SYSTEM
Filed Oct. 21, 1931  2 Sheets-Sheet 1
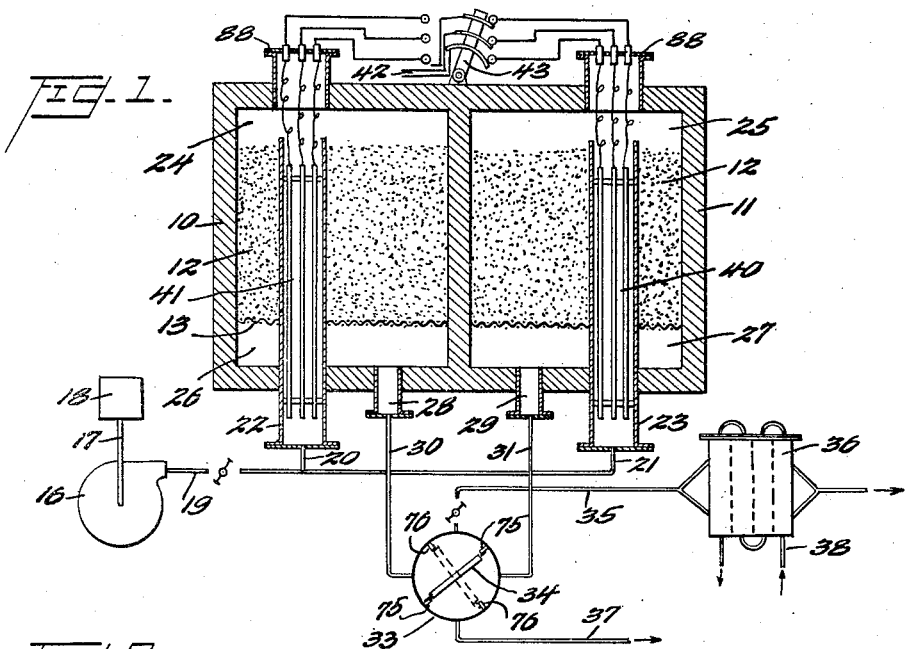
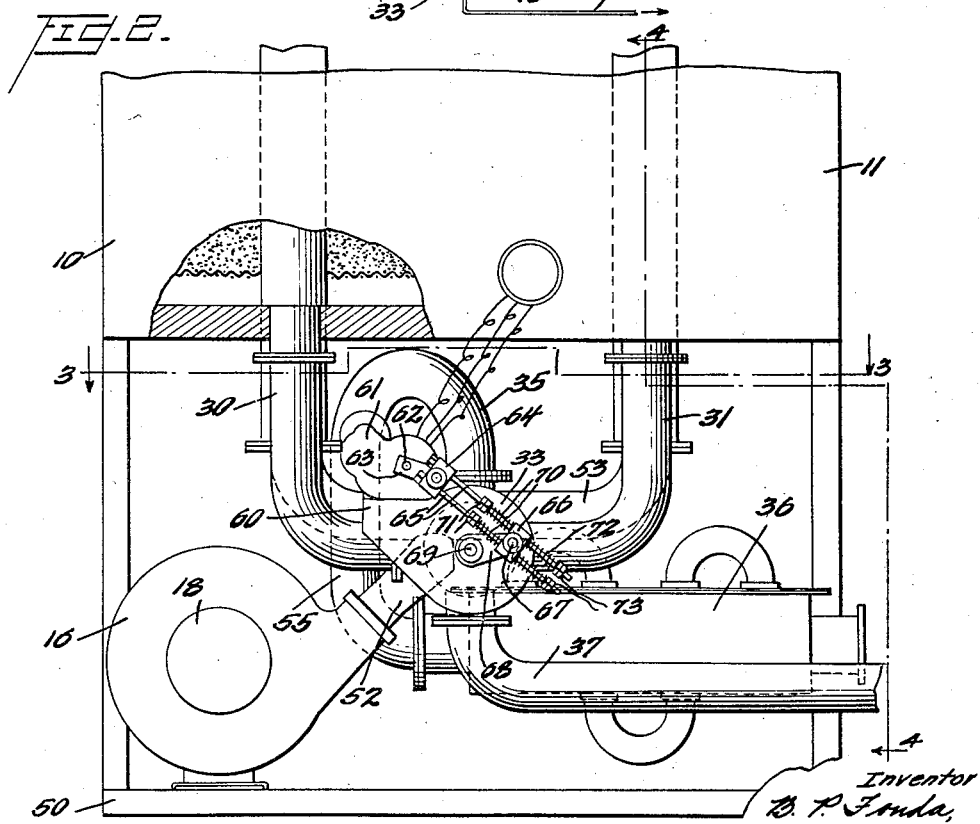
Inventor
B. P. Fonda
By Watson, Cit, Morse & Grindle,
Attorneys

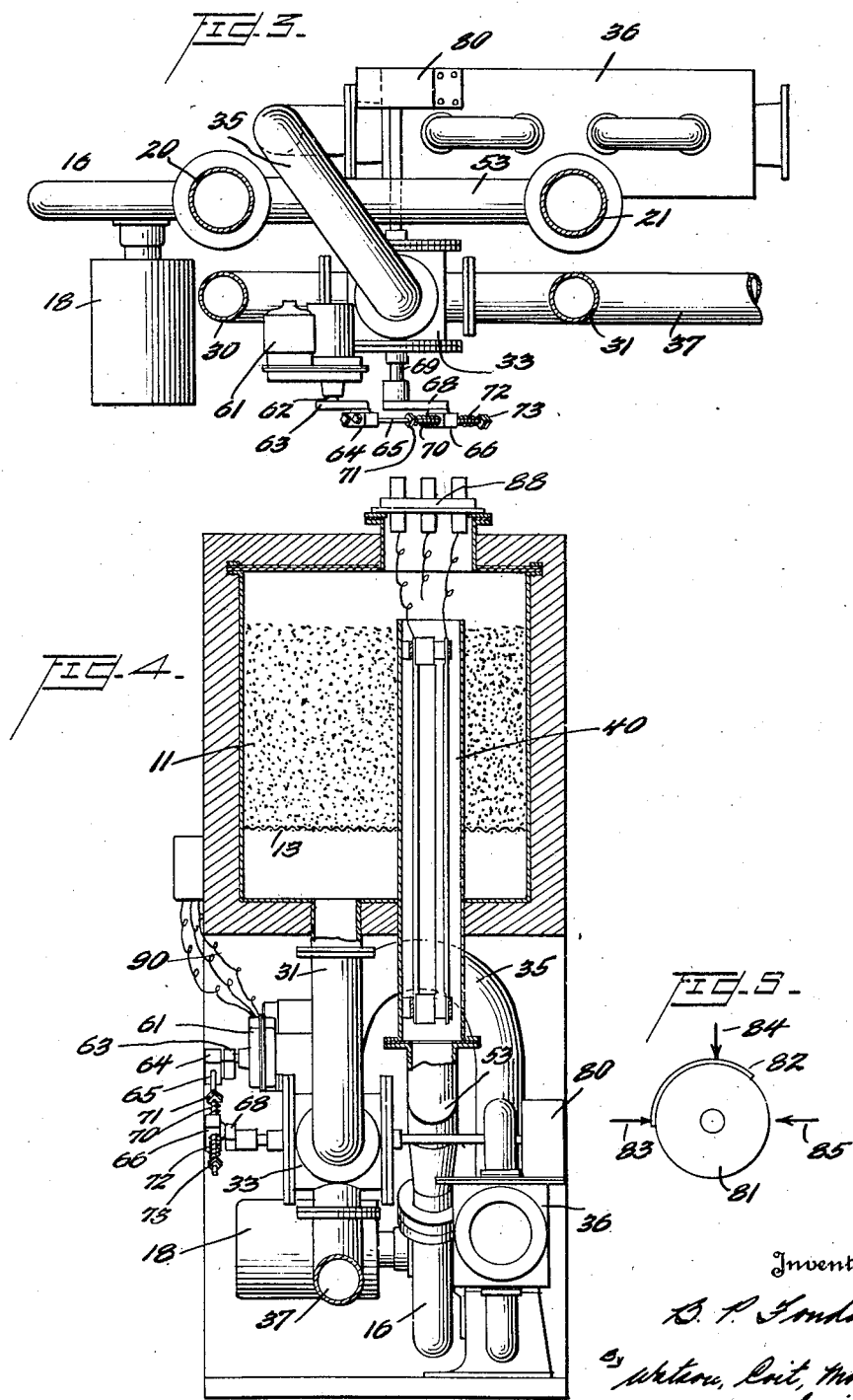

Patented Aug. 29, 1933

1,924,849

UNITED STATES PATENT OFFICE 1,924,849

ADSORPTION SYSTEM

Bayard P. Fonda, Baltimore, Md., assignor to The Silica Gel Corporation, Baltimore, Md., a corporation of Maryland Application October 21, 1931. Serial No. 570,207

4 Claims. (Cl. 183—4)

This invention relates to adsorption systems and more particularly to an improved type of adsorption system and apparatus therefor intended primarily for dehydration.

It is a general object of the present invention to provide a novel and improved adsorption system including apparatus for continuously removing a vapor from a gas or mixture of gases and vapors.

More particularly it is an object of the invention to provide a novel apparatus for adsorption wherein means is provided for activating the adsorbent material at high efficiency.

Another object of the invention resides in the provision of an adsorber having an inlet extending through the bed of adsorbent material therein and having an opening on the side thereof opposite the outlet.

In accordance with another feature of the invention, the inlet pipe to the adsorber which passes through the bed of adsorbent material therein encloses the heating means whereby radiant heat is emitted within the bed of adsorbent and activating gases are heated in the inlet tube for delivery through the bed of adsorbent.

Another important feature of the apparatus resides in the novel arrangement of the parts and in the automatic control to maintain continuous adsorption with cyclic activation.

For a more complete understanding of the invention reference should be had to the accompanying drawings and following specification, wherein is disclosed a single exemplary embodiment of the invention, with the understanding, however, that changes and modifications may be made therein, such as fall within the scope of the appended claims, without departing from the spirit of the invention.

In said drawings:

Figure 1 is a diagrammatic and schematic showing of an adsorption system according to the present invention;

Figure 2 is a side elevation of a complete apparatus, showing a portion of an adsorber casing broken away;

Figure 3 is a horizontal section taken on line 3—3 of Fig. 2;

Figure 4 is a vertical section taken on line 4—4 of Fig. 2; and

Figure 5 shows schematically the construction of the electric switch.

This invention is directed to apparatus for adsorbing a constituent from a gaseous mixture and is primarily intended for the dehydration of air or other gases, such as carbon dioxide, oxygen, and the like, wherever a commercial usage of the same is advantageous. The system and apparatus are designed for continuous operation with the least number of parts, valves and the like.

Referring to Fig. 1, it will be seen that the apparatus comprises essentially two closed adsorber casings 10 and 11 arranged adjacent each other and each provided with a bed 12 of adsorbent material supported above the bottom of the casing on a screen 13 and being spaced from the top of the casing as shown. These beds preferably each comprise a thick layer of hard, granular, porous, adsorbent material, such as a gel of silica, alumina, tungstia, titania or stannia, or with activated carbon. Preferably both adsorbers are charged with silica gel, through which the gas to be treated is passed and which has the characteristic of condensing and holding a vaporous constituent. Such adsorbent can be revivified for further use by heating, and in accordance with the present invention is activated or revivified by passing heated air therethrough.

In Fig. 1 there is shown a fan 16 driven, for instance, by an electric motor, or any other source of power, and having connected to its suction pipe 17 an air filter 18 for removing dust and other harmful substances from the air. Obviously if used for gases other than air, they can be delivered without the fan if under pressure. The fan discharges into a pipe 19 connected at 20 and 21, respectively, to the inlet tubes 22 and 23 for the respective adsorbers.

These are large-diameter tubes which pass snugly through the bottom walls of the two adsorbers and pass up through the beds of adsorbent material and stop substantially at the top level of these beds, whereby air is discharged into the spaces 24, 25 above the beds and is caused to pass in a downward direction through the beds to be discharged into the spaces 26 and 27 beneath the screens 13.

The air which has passed through the beds leaves through the discharge pipes 28, 29 which are connected by the pipes 30 and 31, respectively, to the four-port, two-way valve 33 having the movable vane member 34 which when set as shown causes the gas or the air from the discharge pipe 30 to be delivered into the pipe 35 leading to the cooler 36, whereas the air coming through the adsorber 11 and the discharge pipe 31 is delivered to the waste pipe 37.

The adsorbers are intended to be operated successively and alternately for adsorption, and the adsorber not on adsorption is being revivified or activated. With the setting of the valve 33 shown in Fig. 1, the adsorber 10 is adsorbing and removes moisture from the air being delivered from the inlet pipe 22, so that dry air is discharged from 30 and delivered to the cooler 36. The act of adsorbing raises the temperature of the air due to the heat of wetting of the adsorbent and to the changing of the latent heat of the moisture in the air to sensible heat. The after cooler 36 may be water cooled, as indicated, to remove this heat so that the air in its dried state can be delivered at a temperature determined by the temperature of the water or other cooling fluid introduced from the pipes 38 in the cooler.

The adsorber 11 is assumed to have been previously used for adsorption, so that its adsorbent material has its pores filled with moisture. The air delivered to this adsorber through the inlet pipe 23, is heated by the electric heater 40 within the inlet pipe 23, and in passing downwardly through the adsorbent material drives off the moisture which is discharged with the activating air through the pipe 31 and wasted through the waste pipe 37.

After a period of operation previously determined to be of proper length to use the adsorbent effectively, the valve is shifted to the dotted line position, the heater 40 is shut off, and the heater 41 turned on, whereby the adsorbers reverse their functions. The heaters are shown to be electric and are supplied with current from the power line 42 which is delivered to the respective adsorbers in accordance with the setting of the switch 43. Obviously other types of heaters, such for instance as those using steam or other heated fluids could be used to advantage.

The system disclosed has several advantages. In the first place, there is but a single air delivery fan and a single air filter. There is but a single valve which controls the whole system, and this can readily be arranged to be mechanically operated at regular intervals and also to move the switch which is reversed at the same time that the valve is shifted, as will be disclosed in connection with the commercial form of the apparatus.

By arranging the heaters within the inlet pipes not only is space conserved because the inlet and outlet are both at the bottom of the adsorbers, but the heating elements are housed within the bed of adsorbent material so that no radiated heat is lost.

In the remaining figures is shown a preferred embodiment of the apparatus, which is all mounted on a small rectangular base 50. Supported above this base by any suitable support, such as corner columns, are the two adsorber casings 10 and 11, which closely fit together and are rectangular in form so that the two formed as a unit are of substantially the same area as the base. They are supported sufficiently high above the base to provide space beneath them for all of the rest of the apparatus of the system.

The blower or fan 16 is shown as mounted on the base in the plane passing through the two inlet tubes and having mounted directly on its suction side inlet the filter 18 which is of any well-known type. The fan discharges through an inclined outlet into the section 52 of pipe which leads to the U-shaped section 53 connecting the two inlet tubes for the adsorbers. The valve 33 is seen in Figs. 2, 3 and 4 as being of cylindrical form with a horizontal axis and is connected between the pipes 30 and 31, forming the discharge from the two adsorbers. From the bottom of the valve is seen the pipe 37 leading to a stack or other point of waste, and from the top of the valve the curved pipe 35 is connected to a vertical section 55 which is connected by an elbow to the horizontally mounted cooler 36, which is arranged beyond the fan and near the forward edge of the base.

The valve casing supports a bracket 60 upon which is mounted the half revolution motor 61. This motor is of standard construction and is provided with a shaft 62 which rotates a half revolution by gearing from the motor armature, each time a contact is made to start the motor. The motor has built into it a switch which shuts it off when the shaft has made a half revolution, and the next contact causes it to make another half revolution.

Mounted on the motor shaft 62 is the crank arm 63 having pivoted thereto a block 64 in which are secured the rods 65. These rods are mounted to slide in a block 66 which is pivoted at 67 to the crank arm 68 on the shaft 69 of the valve. Springs 70 are arranged between abutments 71 and the block 66 on the motor side of the block, and springs 72 are arranged between the block 66 and abutments 73 on the ends of the rods. The throw of the crank 68 is greater than the throw of the crank 63, and the valve, as can be seen from Fig. 1, is intended to have a 90° movement to shift the positions of the adsorbers in the circuit.

By the construction just described, a 180° movement of the half revolution motor crank produces a 90° movement of the valve shaft, and this movement is back and forth, although in the half revolution motor the 180° movements are continuous in the same direction. The movement of the crank arm on the valve is such that the springs on the rods are in tension when the valve is stationary, insuring a tight fit of its vane 34 against the sets of stops 75 or 76 respectively.

Any conventional type of switch mechanism may be arranged to control the heaters. They are shown as of the three-phase type, and conveniently a rotary or drum type switch can be mounted as at 80 in Fig. 4, to have its drum driven by an extension of the shaft of the valve. Fig. 5 shows schematically how the drum 81 of insulating material may carry the contact strips 82 slightly greater than 90° in extent which serve in the position shown to connect the terminals 83 for one heater to the terminals 84 to the source of current. It will be seen that a shifting of the drum 90° in a clockwise direction will connect the terminals 84 from the source and the terminals 85 to the other heater. Of course, three sets of contacts and conductor strips 82 are disposed longitudinally along the drum. The contacts 83, 84 and 85 may be carried in the housing 80 of the casing so as to remain stationary, and suitable conductors be led to the source of power and to the terminals of the heaters which are preferably brought out through caps 88 in the top of the adsorber casings. These caps also serve as convenient means for filling or inspecting the adsorbers.

For the purpose of operating the half revolution motor, any type of control may be provided. For instance, a clock, either of the spring or electric type, may be arranged to tilt a three contact mercury bulb to start the half revolution motor at definite intervals, say every twenty minutes, so that each adsorber adsorbs for twenty minutes, and then is activated for twenty minutes while the other adsorber adsorbs. As shown in Fig. 4, the clock could be conveniently mounted on the face of an adsorber and have incorporated therein the contactor, the leads 90 of which may be brought down to the motor as shown.

The apparatus just described is extremely compact and occupies but a small amount of floor space, and is built to produce dried air or other gas with a moisture content which is extremely low and is substantially uniform. No means is provided for cooling the adsorbent material after activation, because the beds are relatively thick and the upper layer will cool almost immediately on contact with the incoming cold air so that adsorption takes place as soon as the phase shift has been made. Thereafter the remainder of the bed is slowly cooled and substantially uniform adsorption takes place throughout the period assigned to adsorption for either one of the beds.

Having thus described the invention, what is claimed as new and desired to be secured by Letters Patent is:

1. In a dehydrating system, in combination, a pair of adsorbers each having an inlet and an outlet, a heater for each inlet, single air delivery means always connected directly to both heaters, a dehydrated air discharge pipe, an activating air discharge pipe, a valve to selectively connect one absorber to each discharge pipe, and means actuated by operation of the valve to actuate the heater of the adsorber connected to the activating air discharge pipe.

2. In a dehydrating system, in combination, a pair of adsorbers each having an inlet and an outlet, an electric heater associated with each inlet, single means to deliver air to both of said heaters continuously, a dehydrated air discharge pipe, an activating air discharge pipe, a valve adapted to selectively connect each adsorber with one of said discharge pipes, and a switch arranged for actuation with said valve to always energize the heater of the adsorber connected to the activating air discharge pipe.

3. In a dehydrating system, in combination, a pair of adsorbers each having an inlet and an outlet, an electric heater associated with each inlet, single means to deliver air to both of said heaters continuously, a dehydrated air discharge pipe, an activating air discharge pipe, a valve adapted to selectively connect each adsorber with one of said discharge pipes, a switch arranged for actuation with said valve to always energize the heater of the adsorber connected to the activating air discharge pipe, and automatic timing means to actuate said valve and switch to interchange the functions of the adsorbers in the cycle.

4. In an adsorption apparatus, in combination, a pair of contiguous adsorber casings elevated above a base, a horizontal bed of adsorbent material spaced from the top and bottom of each casing, an inlet tube through the bottom of each casing and extending through the bed therein, a heater housed in each tube, an outlet conduit from the bottom of each casing; a fan, a dehydrated air cooler and a valve on said base beneath said casings, a pipe connecting the fan to both of said tubes, an activating gas exhaust tube; said conduits, tube and cooler being connected to said valve, and means to actuate said valve to alternately connect the casing outlets to the cooler and exhaust tube.

BAYARD P. FONDA.